(12) United States Patent
Underhill et al.

(10) Patent No.: US 12,267,005 B2
(45) Date of Patent: Apr. 1, 2025

(54) ACTIVE VOLTAGE BUS SYSTEM AND METHOD

(71) Applicant: Moog Inc., East Aurora, NY (US)

(72) Inventors: Mark J. Underhill, East Aurora, NY (US); Danielle Reni, Provo, UT (US); Raymond Druce, Salt Lake City, UT (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 17/484,846

(22) Filed: Sep. 24, 2021

(65) Prior Publication Data

US 2022/0014117 A1 Jan. 13, 2022

Related U.S. Application Data

(62) Division of application No. 14/428,235, filed as application No. PCT/US2013/032408 on Mar. 15, 2013, now Pat. No. 11,159,102.

(Continued)

(51) Int. Cl.
*H02M 1/42* (2007.01)
*H02M 3/335* (2006.01)
*H02M 7/797* (2006.01)

(52) U.S. Cl.
CPC ..... *H02M 1/4216* (2013.01); *H02M 3/33584* (2013.01); *H02M 7/797* (2013.01); *Y02B 70/10* (2013.01)

(58) Field of Classification Search
CPC ............. H02M 1/0003; H02M 1/0009; H02M 1/0016; H02M 1/0019; H02M 1/0022;
(Continued)

(56) References Cited

U.S. PATENT DOCUMENTS

| 5,905,644 A | 5/1999 | Blasko et al. |
| 6,204,627 B1 | 3/2001 | Watanabe et al. |

(Continued)

FOREIGN PATENT DOCUMENTS

| CH | 366595 A | 1/1963 |
| EP | 1220430 A1 | 7/2002 |

(Continued)

OTHER PUBLICATIONS

Heldwein et al. (1999) "A simple control strategy applied to three-phase rectifier units for telecommunication applications using single-phase rectifier modules," Power Electronics Specialists Conference 1999, 30th Annual IEEE Charleston, SC, USA: 795-800.

*Primary Examiner* — Thienvu V Tran
*Assistant Examiner* — Carlos O Rivera-Perez
(74) *Attorney, Agent, or Firm* — Harter Secrest & Emery LLP

(57) ABSTRACT

A voltage converter (110, 210) having a first bidirectional voltage line (112, 212), a second bidirectional voltage line (114, 214), a power storage element (L1) arranged between the first bidirectional voltage line and the second bidirectional voltage line, a switch element electronically coupled to the power storage element, a controller (141) for controlling the switch, and the controller configured and arranged to adjust a current flow between the first voltage line and the second voltage line such that a voltage level on the second bidirectional voltage line is substantially maintained at a target DC voltage.

15 Claims, 8 Drawing Sheets

Related U.S. Application Data

(60) Provisional application No. 61/700,391, filed on Sep. 13, 2012.

(58) Field of Classification Search
CPC .. H02M 1/0025; H02M 1/0067; H02M 1/007; H02M 1/42; H02M 1/4208; H02M 1/4216; H02M 1/4225; H02M 1/4233; H02M 1/4241; H02M 1/425; H02M 1/4258; H02M 3/00; H02M 3/22; H02M 3/24; H02M 3/28; H02M 3/315; H02M 3/3155; H02M 3/325; H02M 3/335; H02M 3/33507; H02M 3/33515; H02M 3/33523; H02M 3/33538; H02M 3/33546; H02M 3/33553; H02M 3/33569; H02M 3/33571; H02M 3/33573; H02M 3/33576; H02M 3/33584; H02M 3/33592; H02M 7/66; H02M 7/68; H02M 7/757; H02M 7/7575; H02M 7/797; Y02B 70/10
USPC ...... 363/15–21.3, 35, 37, 40–48, 65, 74, 78, 363/81, 84, 89, 95, 97, 98, 123–125, 127, 363/131, 132; 323/205–211, 222–226, 323/271–275, 277, 280, 282–285, 351
See application file for complete search history.

(56) References Cited

U.S. PATENT DOCUMENTS

| | | | |
|---|---|---|---|
| 6,342,984 B1* | 1/2002 | Hussein | G11B 21/083 |
| | | | 318/432 |
| 6,728,120 B1 | 4/2004 | Greif et al. | |
| 6,861,936 B2 | 3/2005 | Kamath | |
| 2002/0145897 A1 | 10/2002 | Hanaoka et al. | |
| 2005/0151503 A1* | 7/2005 | Yaeshima | H02M 5/4585 |
| | | | 318/802 |
| 2007/0296364 A1* | 12/2007 | Shoemaker | G05B 13/042 |
| | | | 318/561 |
| 2008/0304296 A1 | 12/2008 | NadimpalliRaju et al. | |
| 2010/0051367 A1 | 3/2010 | Yamada et al. | |
| 2010/0192788 A1* | 8/2010 | Tanaka | H02M 5/4585 |
| | | | 318/400.3 |
| 2010/0244775 A1 | 9/2010 | Smith et al. | |
| 2011/0051371 A1* | 3/2011 | Azuma | B60W 10/08 |
| | | | 361/699 |
| 2013/0057200 A1 | 3/2013 | Potts et al. | |

FOREIGN PATENT DOCUMENTS

| | | |
|---|---|---|
| EP | 2133251 A1 | 12/2009 |
| EP | 2214302 | 8/2010 |
| FR | 1202642 A | 1/1960 |

* cited by examiner

ACTIVE VOLTAGE BUS SYSTEM AND METHOD

CROSS-REFERENCE TO RELATED APPLICATIONS

This application claims priority benefit of U.S. Provisional Patent Application No. 61/700,391 filed Sep. 3, 2012, entitled "Active Voltage Bus System and Method," which is incorporated herein by reference in its entirety.

TECHNICAL FIELD

The present invention relates generally to voltage converter systems, and, more particularly, to bidirectional voltage converter system capable of dynamically adjusting an output DC bus voltage.

BACKGROUND ART

Voltage converters are generally known. For example, U.S. Pat. No. 6,728,120 is directed to a rectifier apparatus having a 12-pulse input converter and an active front end. U.S. Pat. No. 6,861,936 is directed to an autotransformer based system for harmonics reduction.

BRIEF SUMMARY OF THE INVENTION

With parenthetical reference to the corresponding parts, portions or surfaces of the disclosed embodiment, merely for the purpose of illustration and not by way of limitation, a voltage converter (110, 210) is provided comprising: a first bidirectional voltage line (112, 212), a second bidirectional voltage line (114, 214), a power storage element (L1) arranged between the first bidirectional voltage line and the second bidirectional voltage line, a switch element electronically coupled to the power storage element, a controller (141) for controlling the switch, the controller configured and arranged to adjust a current flow between the first voltage line and the second voltage line such that a voltage level on the second bidirectional voltage line is substantially maintained at a target DC voltage.

The target DC voltage may be greater than the peak voltage on the first bidirectional voltage line. The target DC voltage may be less than the peak voltage on the first bidirectional voltage line. The voltage converter may be configured and arranged to dynamically change the target DC voltage without a hardware reconfiguration. The voltage converter may further comprise a bidirectional power factor correction stage, wherein the power factor correction stage is configured and arranged to cause the power quality factor of the voltage converter to be approximately one. The voltage converter may further comprise a bidirectional output filter. The voltage converter may further comprise a bidirectional input filter. The first bidirectional voltage line may be an AC voltage line with multiple phases, and the voltage converter further comprise a modular subcircuit for each phase of the AC voltage line. Each of the modular subcircuits may be connected in parallel. Each the modular subcircuit may comprise power factor correction circuit, a bidirectional isolation circuit, and a pulse width modulation controller, the pulse width modulation controller configured and arranged to provide the power factor correction circuit and the bidirectional isolation circuit pulse width modulated switch gating signals. The power factor correction circuit may comprise a four switch H-bridge. The bidirectional isolation circuit may comprise an isolation transformer. The voltage converter may further comprise two four switch H-bridges. The pulse width modulation controller may receive a voltage feedback signal from the second bidirectional voltage line, a current feedback signal from the power storage element, and/or a voltage feedback from the first bidirectional voltage line. The pulse width modulation controller may be configured and arranged to provide switch gating signals to the power factor correction circuit to cause the voltage converter to have a power quality factor of approximately one. The pulse width modulation controller may be configured and arranged to provide switch gating signals to the bidirectional isolation circuit to cause the first bidirectional voltage line to be electrically isolated from the second bidirectional voltage line. The pulse width modulation controller may be configured and arranged to cause the voltage on the second bidirectional voltage line to be maintained at a target DC voltage. The power storage element may be an inductor. The power storage element may be a capacitor. The voltage converter may comprise a plurality of IGBT switch elements. The voltage converter may be configured and arranged for use in an aircraft. The voltage converter may further comprise an electric motor and the voltage converter may be configured and arranged to transfer power from the electric motor to the power input during a regeneration phase. The first bidirectional voltage line and the second bidirectional voltage line may have no shared hardwire connection. Each power factor correction circuit may be configured and arranged to cause a current through the power storage element to be in phase with a voltage of the power storage element.

In another aspect, provided is a method of operating a voltage bus system having the steps of: providing a voltage converter having a power supply input, an output DC voltage bus, and a command; causing the voltage converter to provide a DC voltage at a first voltage level on the output DC voltage bus; receiving a target voltage change command; and dynamically adjusting the voltage converter to cause the voltage converter to provide a DC voltage at a second voltage level on the output DC voltage bus.

The step of providing a voltage converter may include the step of providing the voltage converter on an aircraft. The method may further comprise the step of connecting a load to the output DC voltage bus. The step of dynamically adjusting the voltage converter may be configured and arranged to cause the load efficiency to change. The load may be an electric motor. The step of dynamically adjusting the voltage converter may cause the electric motor to operate with a changed Kt value.

In another aspect, provided is a power factor correction circuit (16) controller comprising: an AC input voltage feedback input (162), an input current feedback input (164), an output voltage feedback input (166), a voltage reference, a multiplier (184) configured and arranged to multiply the AC input voltage by a difference between the output voltage feedback and the voltage reference and produce a multiplier output, a first analog inverter (186) configured and arranged to invert the multiplier output, a second analog inverter (172) configured and arranged to invert the input current feedback, a differential amplifier (190) configured and arranged to amplify a difference between the first analog inverter's output and the second analog inverter's output, a pulse width modulation generator (192) configured and arranged to generate a pulse width modulated signal as a function of the differential amplifier's output, and a digital inverter (192) for inverting the pulse width modulation generator's output.

The power factor correction circuit controller may further comprise a voltage converter having a power storage unit, and the power factor correction unit may be configured and arranged to cause a voltage across the power storage unit to be generally proportional to the differential amplifier's output. The power factor correction circuit controller may further comprise a feedback scaler configured and arranged to scale one of the feedback inputs. The controller may be implemented on one of a complex programmable logic device, a field programmable gate array, and an application specific integrated circuit. The digital inverter's output may be configured and arranged to be provided to a voltage converter active front end bridge. The controller may be configured and arranged to cause the voltage converter to have a quality factor of approximately one.

DESCRIPTION OF THE PREFERRED EMBODIMENTS

Figure 1:
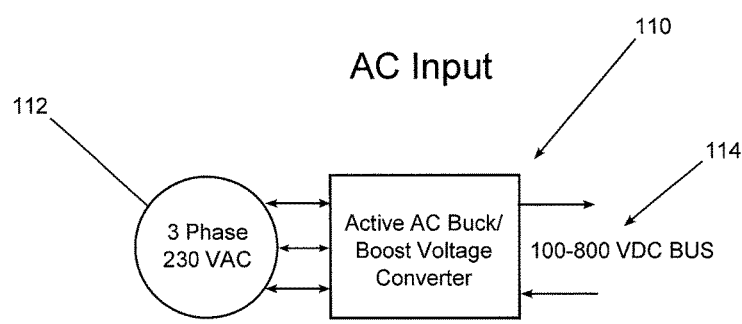
FIG. 1 is a high level diagram of a first embodiment active voltage bus system and method.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Provided is a novel voltage converter architecture, a novel power factor correction control controller, and a novel method of active DC bus voltage control. More specifically, the novel voltage converter includes an improved buck boost converter architecture having a bidirectional active front end H-bridge power factor correction stage, and a bidirectional transformer isolation and scaling stage. The voltage converter is capable of operating bi-directionally. For example, power can either flow from an AC or DC source through the converter to an output bus; or power can flow in reverse from the output bus through the converter and into a voltage source. Reverse power flow is typical during a regenerative mode, such as regenerative motor braking.

Additionally, the voltage converter is capable of dynamically adjusting the output bus voltage for improved system efficiency in a novel active bus system. For example, in a system with an electric motor driven with a motor driver connected to the voltage bus, it may be beneficial to temporarily adjust the voltage bus voltage above a nominal level. The higher than nominal bus voltage allows the motor to either provide equivalent torque with reduced thermal losses in the motor driver, or operate with a higher maximum torque or speed. The bus voltage can be reduced back to the nominal level during normal operating conditions in order to reduce high voltage stresses on the system.

Other general characteristics of some embodiments of the novel voltage converter include AC to DC voltage conversion with an isolated subcircuit for each AC phase, and having filters at the input, power factor correction, and output stages.

A novel voltage converter controller is also provided which advantageously minimizes noise during cross over conditions when the system power flow switches from power being delivered to the bus to power being received from the bus and vice versa.

FIG. 1 is an input/output diagram of a first embodiment of the novel voltage converter, which is shown at 110. Voltage converter 110 interfaces between three phase 230 VAC power source 112 and DC bus 114. The voltage on DC bus 114 can be controlled to be between 100-800 volts as desired in real time. In addition to transferring power from power source 112 to voltage bus 114, voltage converter 110 can work in reverse, transferring power from voltage bus 114 into power supply 112.

Figure 2:
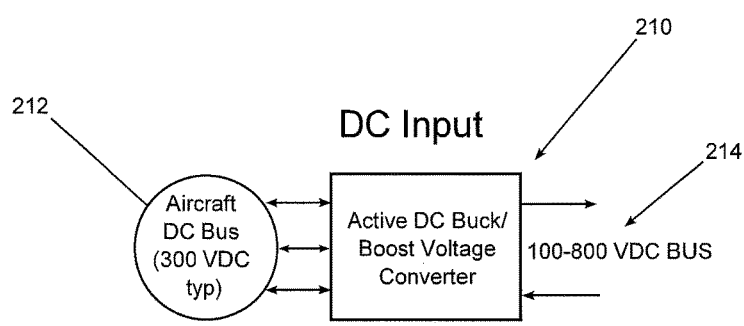
FIG. 2 is a high level diagram of a second embodiment active voltage bus system and method.

FIG. 2 is an input/output diagram of a second embodiment voltage converter 210 which interfaces between major DC bus 212 having a voltage of approximately 300 volts and local DC bus 214, for which the output voltage can be actively set between 100-800 volts.

Figure 3:
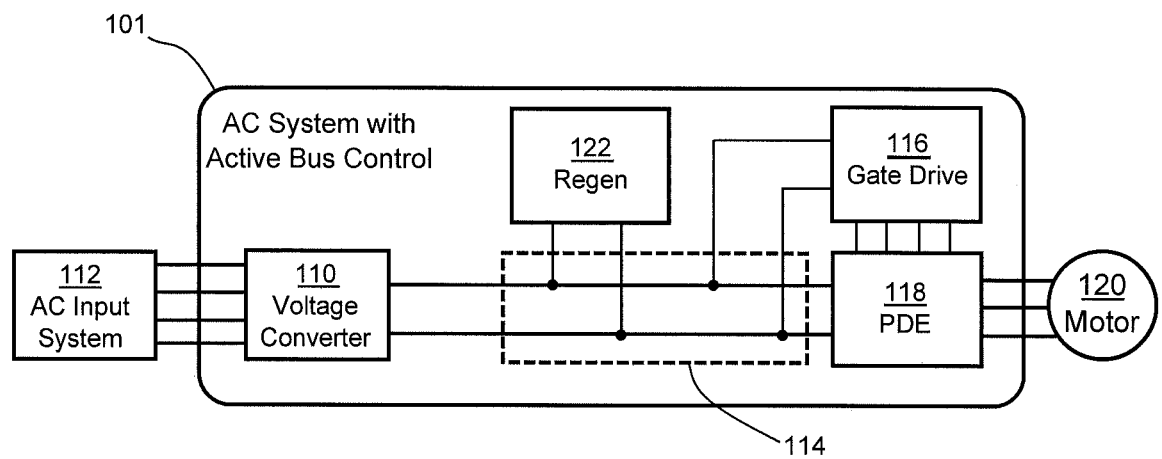
FIG. 3 is a system level diagram of a system using the first embodiment active voltage bus.

FIG. 3 is a system diagram showing an electronic system with an AC active bus system 101 that contains first embodiment voltage converter 110. As shown in FIG. 3, electronic system 101 interfaces with AC input 112, which provides three phase AC voltage to voltage converter 110. Four lines are arranged between AC input 112 and voltage converter 110, one line for each AC phase, and one line for a common ground. Voltage converter 110 regulates the voltage on DC bus 114. DC bus link 114 connects to gate drive 116 and power drive electronics (PDE) 118. PDE 118 drives electric motor 120. Also connected to DC bus 114 is regeneration block 122.

In nominal voltage operation mode, voltage converter 110 sets the voltage on DC bus 114 to a nominal voltage, such as 100 volts. Voltage converter 110 adjusts the power draw from AC power source 112 such that the voltage level set on DC bus 114 is maintained. Power is typically transferred from AC power source 112 through voltage converter 110 to power drive electronics 118 to motor 120.

Voltage converter 110 also seamlessly operates with reversed power flow. If either motor 120 is in a regenerative braking mode, or separate regeneration block 122 is actively providing power to bus link 114, voltage converter 110 will transfer this power to AC power supply 112. The direction of power flow occurs automatically based upon the current needed to maintain the DC bus voltage.

Voltage converter 110 may further operate in a high voltage operation mode, for which the voltage on DC bus 114 is increased to a higher than nominal voltage, such as 200 volts. A higher bus voltage provides a higher operating thermal efficiency for PDE 118 and motor 120. In addition, the torque constant, Kt, of motor 120 may be non-linear with respect to voltage, and may result in a higher Kt with the higher bus voltage.

In order to reduce strain on the components of system 110 caused by a higher than nominal voltage, the voltage on DC bus 114 is typically returned to the nominal voltage level after a short duration.

Voltage converter 110 is also capable of transferring power in either forward or reverse direction to DC bus 114 also when operating in the high voltage operation mode.

Figure 4:
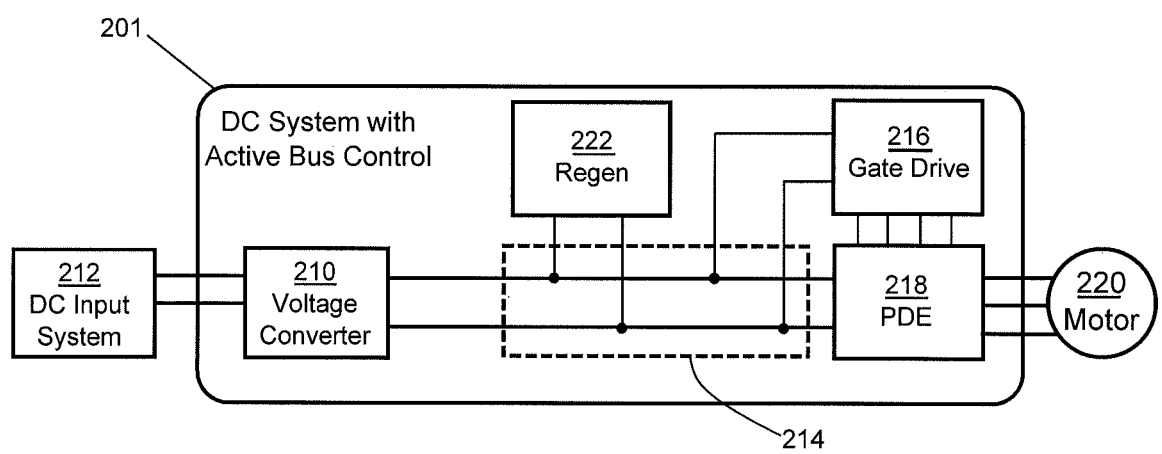
FIG. 4 is a system level diagram of a system using the second embodiment active voltage bus.

FIG. 4 is a system diagram showing an electronic system with DC active bus system 201, which contains a form of the voltage converter shown at 210. As shown in FIG. 4, electronic system 201 interfaces with major DC bus 212, which provides DC input voltage to voltage converter 210. Voltage converter 210 regulates the voltage on local DC bus 214. Local DC bus link 214 connects to gate driver 216 and power drive electronics (PDE) 218. PDE 218 drives electric motor 220. Also connected to local DC bus 214 is regeneration block 222.

With the exception of having a DC input instead of an AC input, the system level operation of DC active bus system 201 is identical to the system level operation of AC active bus system 101 described above.

Figure 5:
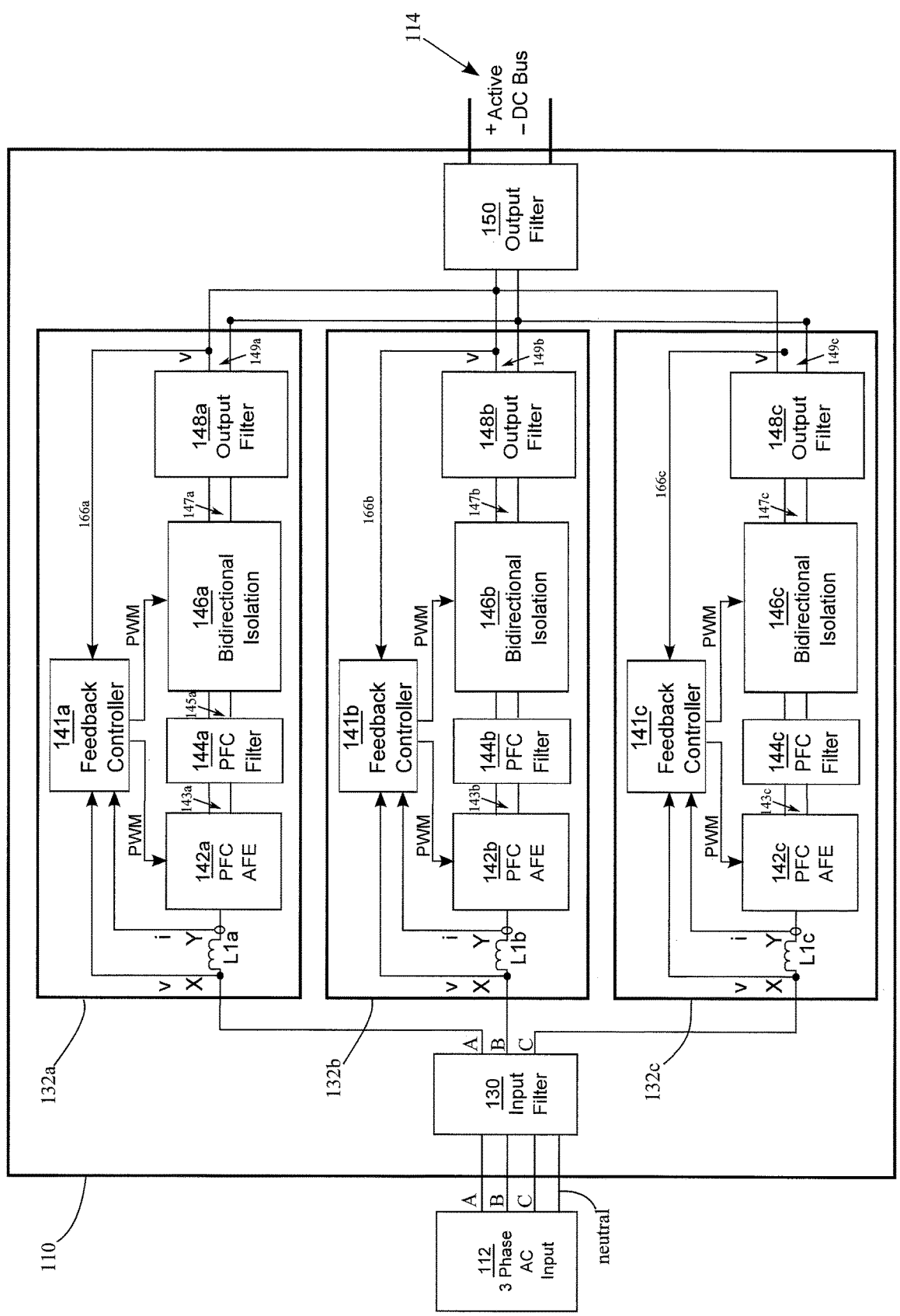
FIG. 5 is a general circuit topology diagram of a first embodiment voltage converter.

FIG. 5 is a functional block diagram of the components of voltage converter 110, shown in FIGS. 1 and 3. Voltage converter 110 includes the primary components of input filter 130, phase A subcircuit 132a, phase B subcircuit 132b, phase C subcircuit 132c, and combined phase output filter 150. Each of the isolated subcircuits 132a, 132b, and 132c, contain identical components, circuit topology, functionality. This common subcircuit structure is shown at 132 in FIG. 6. More specifically, common subcircuit 132 includes boost inductor L1, power factor correction stage 142, power factor correction filter 144, bidirectional isolation stage 146, feedback controller 141, and output filter 148.

As shown in FIG. 5, voltage converter 110 is connected to 3-phase AC power source 112. The power lines (called "flow paths" herein) coming from AC power source 112 for each phase (phase A, phase B, phase C), are connected from AC power source 112 to input filter 130. Each flow path passing through input filter 130 is connected to a corresponding isolated subcircuit 132a, 132b, 132c. The phase A flow path is connected from input filter 130 to phase A subcircuit 132a. Similarly, the phase B flow path is connected from input filter 130 to phase B subcircuit 132b; and the phase C flow path is connected from input filter 130 to phase C subcircuit 132c.

Each subcircuit 132a, 132b, 132c has a corresponding pair of DC outputs 149a, 149b, 149c. Each subcircuit DC output 149a, 149b, 149c has a positive rail and a negative rail. All of the positive rails of DC outputs 149a, 149b, 149c are connected together and connected to output filter 150. Similarly, all of the negative rails of DC outputs 149a, 149b, 149c are connected together and likewise connected to output filter 150. Output filter 150 is connected to positive and negative rails of active DC bus 114.

As shown in FIG. 5, the phase A flow path from filter 130 to subcircuit 132a connects to boost inductor L1a. The voltage at the input side of inductor L1a is sampled by feedback controller 141a. Also, the current passing through inductor L1a is sampled by feedback controller 141a.

The output side of inductor L1a is connected to power factor correction ("PFC") stage 142a, which is also referred to as the active front end ("AFE"). PFC 142a receives pulse width modulation ("PWM") drive signals from feedback controller 141a. PFC 142a has two DC output lines 143a. Output lines 143a are connected to PFC filter 144a which has two PFC filtered DC output lines 145a. The two PFC filtered DC output lines 145a are connected to bidirectional isolation stage 146a. Bidirectional isolation stage has two isolated DC outputs 147a which connect to output filter 148a. Output filter 148a has two DC outputs 149a which constitute the phase A subcircuit outputs. The positive rail of DC output 149a is connected as a feedback signal to feedback controller 141a.

The structure and operation of subcircuits 132b and 132c are the same as described for subcircuit 132a. While the current embodiment shows three separate subcircuits 132a, 132b, 132c for each phase of three phase AC power source 112, it should be noted that the current embodiment can be modified to work with an AC power source with any number of phases, or even a single phase, by merely having an equivalent number of phase subcircuits as AC power source phases.

Under a "forward operation" mode of voltage converter 110, power flows from AC power source 112, through voltage converter 110, and out to DC bus 114. However, it is possible for power to flow in the opposite direction in a "reverse operation" mode, e.g. from DC bus 114, through voltage converter 110, and out to AC power source 112. Thus, the designations of components and connections as inputs or outputs is merely to describe the typical current flow direction and is not intended to designate the only functional current flow direction since each flow path block of voltage converter 110 is bidirectional.

Input filter 130 reduces PWM high frequency switching transients from the PFC stages 142a, 142b, 142c that would otherwise pass out to AC power source 112. This ensures that AC power source 112 sees a more steady current draw and that high frequency conducted emissions requirements are met.

Inductors L1a, L1b, L1c are used to boost the input voltage in forward power flow in concert with PFC stages 142a, 142b, 142c. More specifically, PFC stages 142a, 142b, and 142c contain switch networks which alternatively connect boost inductors L1a, L1b, L1c with either AC power source neutral or one of the rails of DC bus 143. For example, during a positive voltage portion of AC power source 112's phase A cycle, PFC 142a alternatively connects boost inductor 142a to power source neutral or to the positive rail of 143a. During a negative voltage portion of the phase A cycle, PFC 142a alternatively connects boost inductor L1a to ground or the negative rail of 143a. Control of the switches in PFC 142a, 142b, and 142c are respectively controlled through pulse width modulated (PWM) signals provided by feedback controllers 141a, 141b, and 141c. Feedback controllers 141a, 141b, 141c each adjust the PWM signals they output based upon the feedback signals they receive including each phase voltage of AC source 112, each current of inductors L1a, L1b, L1c, and each phase subcircuit's output filter 148a, 148b, 148c output voltage. The duty cycle and/or timing of the PWM signals are controlled to: (1) maintain a unity power factor of the input power with respect to AC power source 112, (2) maintain a very low harmonic distortion sinewave of the input current on each phase, and (3) control the voltage on active DC bus 114.

PFC filters 144a, 144b, and 144c smooth the voltage produced on the DC rails 143a, 143b, 143c by the PFC stages 142a, 142b, 142c. The DC rails 145a, 145b, 145c are connected to the bidirectional isolation stages 146a, 146b, and 146c which provide for DC voltage level scaling and isolation. More specifically, bidirectional isolation stages 146a, 146b, and 146c each contain a switch bridge and high frequency power transformer (shown FIG. 6) which use PWM signals provided by feedback controllers 141a, 141b, and 141c respectively to produce an isolated and potentially scaled DC voltage on DC rails 147a, 147b, and 147c.

Phase subcircuit output filters 148a, 148b, and 148c stabilize the voltage on each phase subcircuit's DC output lines 149a, 149b, and 149c, respectively. Each of output lines 149a, 149b, and 149c are connected in parallel and passed through combined output filter 150, which attenuates high frequency transients from reaching DC bus 114.

Voltage converter 110 is capable of actively adjusting the voltage on active DC bus 114 in realtime without hardware reconfiguration. More specifically, by adjusting the PWM signals to PFCs 142a, 142b, 142c and/or bidirectional isolation stages 146a, 146b, 146c, the voltage level at DC output lines 149a, 149b, 149c is altered to match a target voltage.

Voltage converter 110 is capable of running in reverse, i.e. with the power flowing from DC bus 114 to AC power source 112 for conditions such as regenerative braking of an electric motor load. Based upon the voltage feedback 166a, 166b, 166c received from output lines 149a, 149b, and 149c, feedback controllers 148a, 148b, and 148c will adjust the PWM gate drive signals to provide the proper circuit path for power to flow from DC lines 147 through bidirectional isolation stages 146 to DC lines 145. Similarly, the PWM signals to the PFC stages 142 are configured to provide a current path from DC lines 143 through inductors L1 and on to AC power source 112. Inductors L1a, L1b, L1c act as a power converter "buck" when operating in this reverse mode.

Figure 6:
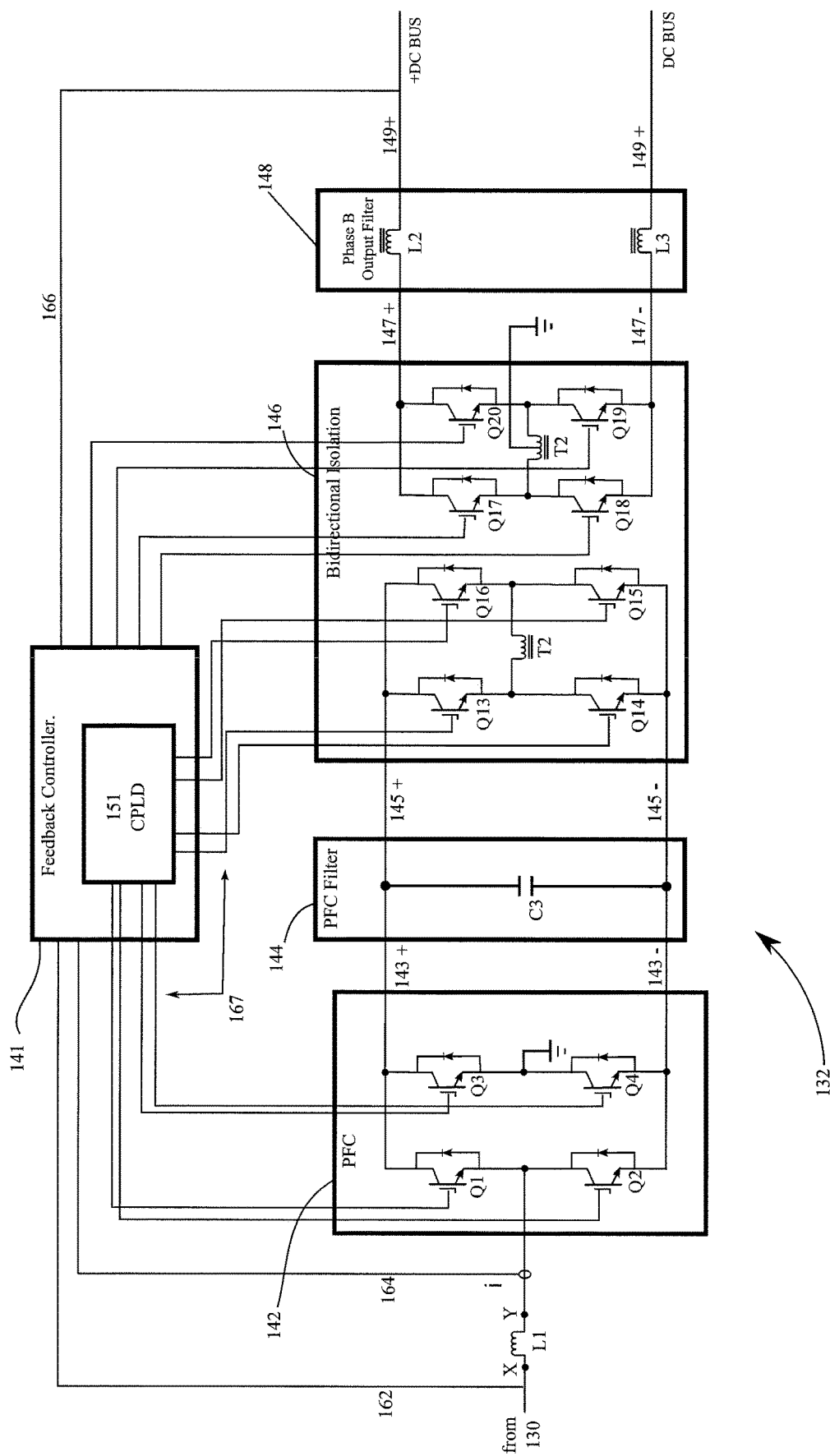
FIG. 6 is a circuit diagram of a single phase subcircuit of the voltage converter shown in FIG. 5.
Figure 7:
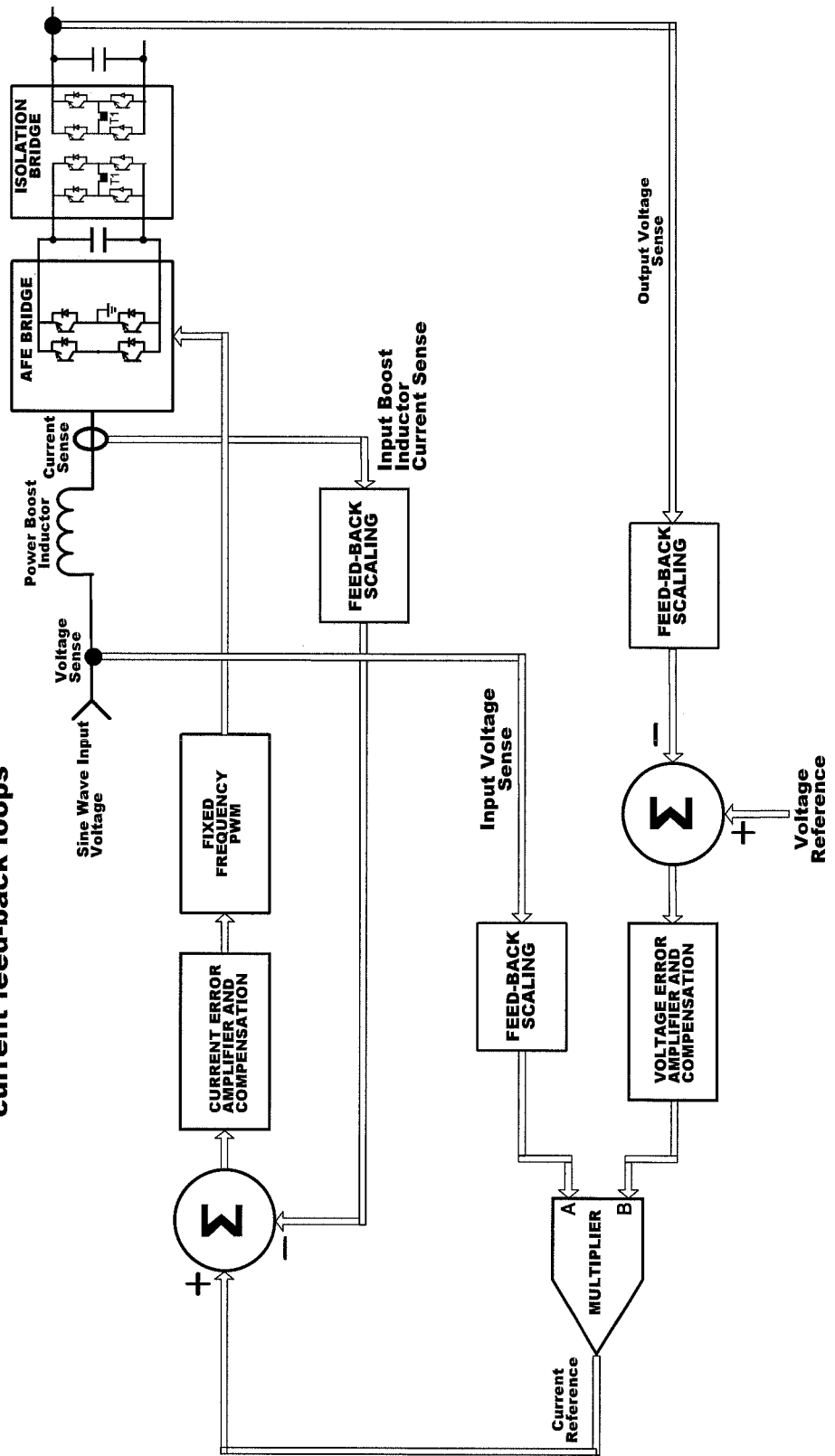
FIG. 7 is a small signal model of a conventional PFC control circuit.

FIG. 6 provides a more detailed view of the hardware implementation of the circuit used in the phase subcircuits 132a, 132b, and 132c shown in FIG. 5. As shown in FIG. 6, PFC stage 142 includes four power switches Q1, Q2, Q3, and Q4 arranged in a bridge. More specifically, Q1 is arranged between L1 output terminal Y and DC line 143+ and Q2 is arranged between L1 output terminal Y and DC line 143−. Switch Q3 is arranged between DC line 143+ and AC power source 112 neutral, and Q4 is arranged between AC power source 112 neutral and DC line 143−. All switches receive independent gate drive signals from feedback controller 144. Each of switches Q1, Q2, Q3, Q4 contain an antiparallel diode as shown. Switches Q1, Q2, Q3, Q4 are insulated gate bipolar transistors (IGBTs) with internal fast recovery antiparallel diodes in this embodiment. However, field effect transistors (MOSFET, JFET, power FET), bipolar junction transistors, or other similar devices may be used as an alternative.

In typical normal operation, the DC voltage between PFC output rails 143+ and 143− is greater than the peak input AC power supply voltage (line to neutral). PFC stage 142 is provided PWM signals to produce a target current waveform of current through the boost power inductor terminal Y such that AC power source 112 sees a unity power factor and DC bus 149 is maintained at the correct voltage level. More specifically, the current waveform is controlled to be a sinusoid in phase with AC power source 112's voltage, thus producing a unity power factor. When a positive voltage (with respect to AC power supply 112 neutral) is desired at the inductor L1 terminal Y, switch Q4 is turned on 100% and switch Q3 is turned off 100%. Switch Q1 and Q2 are alternately switched on and off with dead time to produce the desired positive average voltage at inductor L1 terminal Y. When a negative voltage (with respect to neutral) is desired at inductor L1 terminal Y, switch Q4 is turned off 100% and switch Q3 is turned on 100%. Switches Q1 and Q2 are alternately switched on and off with dead time to produce the desired negative average voltage at inductor L1 terminal Y. The averaged voltage across inductor L1 will be controlled to be a sine wave of proper amplitude and phase to produce the desired input current from the source. In this embodiment, the desired current waveform is a low distortion sine wave, in phase with AC power source voltage for power flow from input to output and 180 degrees out of phase for power flow from output to input. Through this method of operation, control of the AC input current can be achieved for both polarities of the input voltage. Further, the described operation of the PFC switching works the same regardless of whether voltage converter 110 is operating in a forward power flow mode, or a reverse power flow mode (such as in regenerative braking of an electrical motor load).

The switches Q3 and Q4 are switched at the AC power supply input frequency while transistor Q1 and Q2 are switched at a higher PWM frequency. This causes the noise voltages at DC output 143 to have a frequency equal to the input voltage frequency and not the PWM frequency.

Bidirectional isolation stage 146 provides for isolation between DC bus 149 and input power supply 112 and provides for scaling the output voltage on DC bus 149 to the desired level. As shown in FIG. 6, bidirectional isolation stage 146 includes two H bridges having four switches each, (first H bridge H1 having Q13, Q14, Q15, Q16 and second H bridge H2 having Q17, Q18, Q19, Q20) and power transformer T2. The primary winding P of T2 is arranged in the center of the first H bridge and the secondary winding S of T2 is arranged in the center of the second H bridge as shown. Switches Q13-Q20 are insulated gate bipolar transistors with internal fast recovery antiparallel diodes in this embodiment. However, field effect transistors, bipolar junction transistors, or other similar devices may be used as an alternative. The turns ratio of transformer T2 can be adjusted to provide for a basic fixed adjustment of the output voltage on DC lines 149.

First H bridge H1 (Q13, Q14, Q15, Q16) is used to chop the DC voltage from PFC filter 144 and produce a high frequency AC voltage for isolation power transformer T2. The switches in bridge H1 are normally energized by feedback controller 141 at close to 100% duty cycle with a small dead time. Transformer T2's switching frequency is chosen to optimize core size and converter efficiency. Second H bridge H2 (Q17, Q18, Q19, Q20) acts as a synchronous full bridge rectifier to rectify the AC voltage induced in secondary winding S of T2. Bridge H2 (Q17, Q18, Q19, Q20) is also noitiially energized by feedback controller 141 at close to 100% duty cycle with a small overlap time.

When operating with power flow in the reverse direction, the first H bridge H1 acts as a synchronous rectifier and the second H bridge H2 is used to chop the voltage from output voltage DC lines 149 with small overlap. In this case, the circuit operates as a boost converter with a very small duty cycle. For power flow in the reverse direction, the small overlap time provided for the second H bridge acts as a low duty cycle control for the reverse direction boost circuit.

Figure 11:
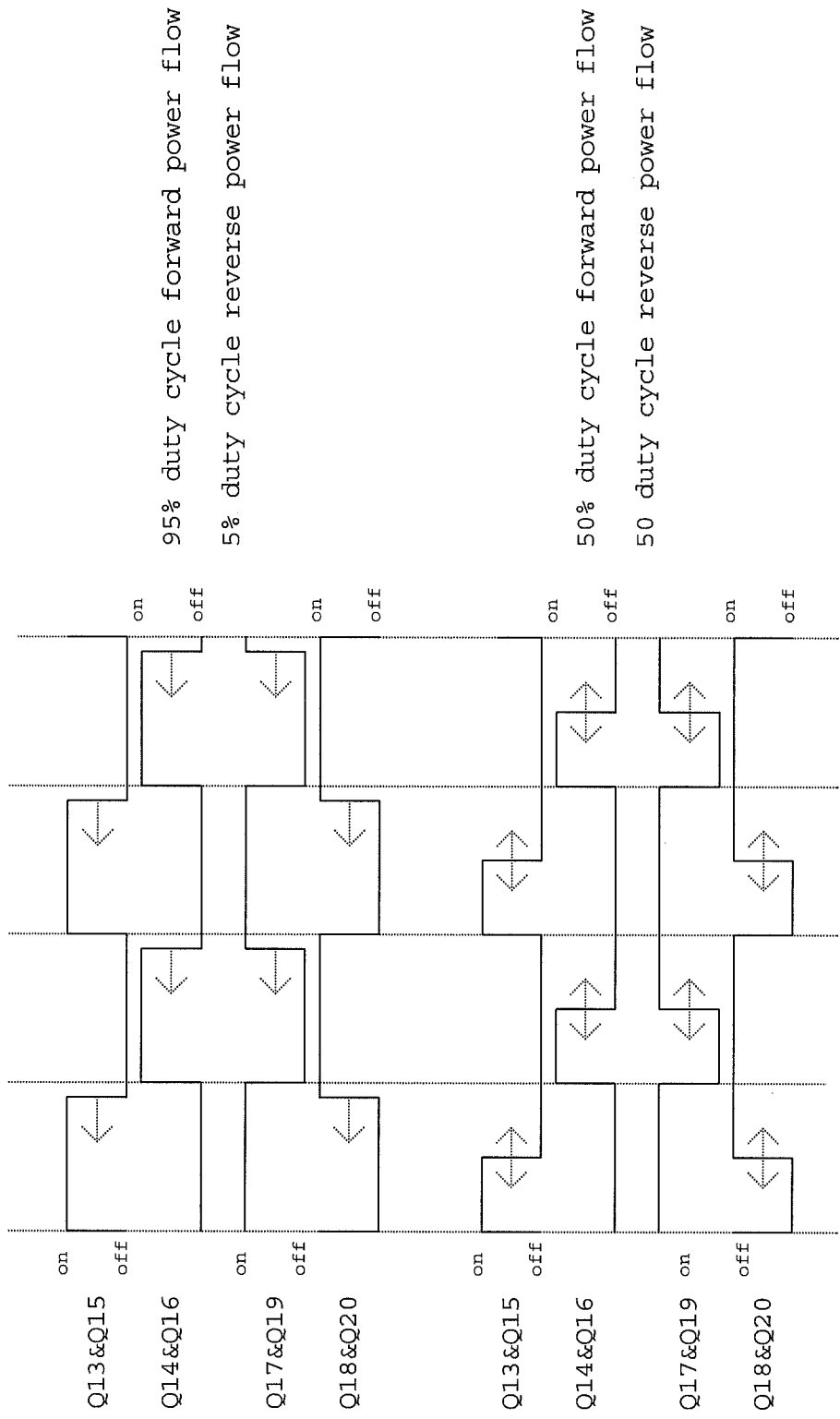
FIG. 11 is a diagram of the switch gate PWM signals for different duty cycles.

It is also possible to control the output voltage on DC lines 149 to a voltage less than the voltage on bus 145. This is accomplished by reducing the duty cycle from feedback controller 141 to less than 100% when power flow is in the forward direction. In the event of negative power flow, the circuit operates as a boost converter with duty cycle increasing from 0% to step up the voltage from output to input. This operating mode performs equally well for forward power flow and negative power flow with no change in the operating characteristics of feedback controller 141. FIG. 11 provides a diagram of the PWM format for the bidirectional isolation stage. The top half of the diagram shows operation at close to 100% duty cycle for forward direction of power flow and at just over 0% duty cycle for reverse direction of power flow. In this case the output voltage at DC lines 149 has not been lowered in value. The bottom half of the diagram shows operation at 50% duty cycle for forward direction of power flow and at 50% duty cycle for reverse direction of power flow. In this case the output voltage at DC lines 149 has been lowered in value to half of the normal value.

Additional windings may be added to T2 produce multiple secondary output voltages as needed with isolation from ether winding as required.

The purpose of feedback controller 141 is to provide PWM signals to PFC 142 having the correct duty cycle and pulse width. More specifically, the PWM duty cycle is varied based upon feedbacks received, including the voltage of AC power source 112, the current through inductor L1, and the voltage level of DC bus 114. The PWM duty cycle is adjusted such that the voltage of DC output 114 is properly maintained, and such that the current flow between AC power source 112 and DC bus 114 has a waveform matching the shape and phase of the voltage waveform of AC power source 112 to produce a unity power factor. Feedback controller 141 also provides for the control of the bidirectional isolation stage 146.

Figure 8:
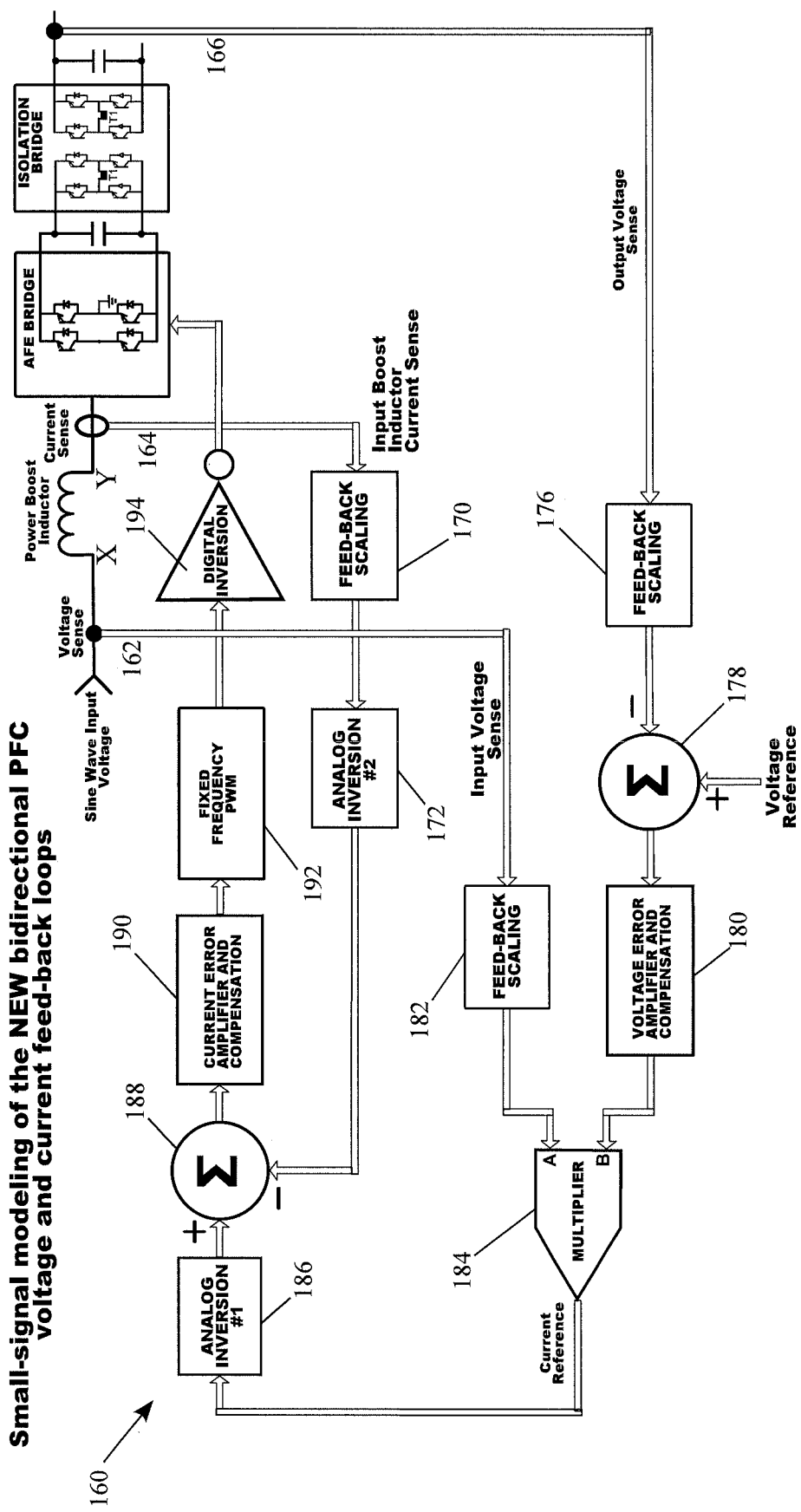
FIG. 8 is a small signal model of the PFC control circuit of the voltage converter shown in FIG. 5.

As shown in FIG. 6, feedback controller 141 includes logic device 151. In this embodiment, logic device 151 is a complex programmable logic device (CPLD). However, microcontrollers, FPGAs, ASICs, or other similar devices may be used as an alternative. FIG. 8 is a small signal model of PFC control algorithm/circuit 160 implemented on feedback controller 141.

Power factor control circuit 160 receives multiple feedback signals including input voltage 162, inductor current 164, and output voltage feedback 166. Power factor control circuit 160 outputs PWM signals 167 having a fixed frequency of approximately 100 kHz to the PFC 142 (AFE bridge). The width of PWM signals 167 are adjusted by PFC circuit 160 based upon feedback signals 162, 164, and 166.

PFC control circuit 160 includes the major elements of feedback scalers 170, 176, and 182, summing stages 178, and 188, analog inverters 172, and 186, voltage error amplifier and compensation block 180, analog multiplier 184, current error amplifier and compensation block 190, and fixed frequency PWM block 192.

As shown in FIG. 8, input voltage feedback 162 is connected to feedback scaler 182, which then connects to input A of multiplier 184. Output voltage feedback 166 is connected to scaler 176, whose output is then subtracted in summing block 178 from a voltage reference. The output of summing block 178 is passed to voltage error amplifier and compensation block 180, whose output is connected to the B input of multiplier 184. The output of multiplier 184 is connected to analog inverter 186.

Inductor current feedback 164 is connected to feedback scaler 170, whose output is connected to analog inverter 172. Summing stage 188 subtracts analog inverter 172's output from analog inverter 186's output and provides the result to current error amplifier and compensation block 190. The output of current error amplifier and compensation block 190 is passed to fixed frequency PWM block 192, whose output is passed to digital inverter 194 to produce the PWM signals provided to PFC 142 (AFE bridge).

An outer feedback control loop is formed with DC output voltage 149 through feedback line 166 and effectively controls the DC output voltages of the voltage converter. The reference voltage provided to summing stage 178 represents the target voltage that PFC control circuit 160 tries to match the DC output 149 to. Feedback scaling 176 may scale the feedback output voltage 149 in order to put the feedback output voltage 166 in the same units as the target reference voltage. Summing stage 178 calculates the error between scaled output voltage 166 and the reference voltage, and provides this error signal to voltage error amplifier and compensation block 180. Voltage error amplifier and compensation block 180 amplifies and compensates the DC output error signal before passing it to multiplier 184 input B.

Input voltage feedback 162 is a sinusoidal AC signal, unlike DC output signal 149. Input voltage feedback 162 is scaled by scaler 182 before it is passed to input A of multiplier 184. The output of multiplier 184 is effectively a "copy waveform" of the input voltage sinusoid waveform but with its magnitude proportional to the amplified and compensated DC output error signal (the output of 180).

In the case of when DC output voltage 149 is lower than the target reference voltage, power should flow from AC input 112 to DC output bus 114, and voltage error amplifier and compensation block 180's output will be positive. In the alternative case of when DC output voltage 149 is higher than the target reference voltage, power should flow from the DC output bus to the AC input, and voltage error amplifier and compensation block 180's output will be negative. In case of no power flow, when output DC bus voltage 149 equals the target reference voltage, voltage error amplifier and compensation block 180's output will be at zero. The use of a single amplifier to monitor and control the power flow in both forward and reverse directions with respect to the DC bus allows for an uninterrupted control between either forward power or reverse power operational mode.

The output from multiplier 184 is next inverted by analog inverter 186. Operating in parallel, inductor current feedback 164 is scaled by scaler 170 and then inverted by analog inverter 172. Summing stage 188 then subtracts the scaled inverted current feedback coming out of inverter 172 from the scaled inverted signal coming out of inverter 186. More specifically, summing stage 188 finds the difference between the input voltage waveform signal from 186, which has a magnitude equal to the DC bus voltage error, and the inductor current waveform signal. Effectively, this resulting difference or error signal is a measure of how closely the current and voltage signals match each other, which is directly related to the quality factor that AC input 112 sees. In other words, in order to achieve a unity power factor, the current waveform through inductor L1 should match the voltage waveform at inductor L1's X input terminal. Current error amplifier and compensation block 190 provides amplification and compensation of this error signal and provides the output to fixed frequency PWM block 192. Fixed frequency PWM block 192 produces a square wave output signal having a duty cycle proportional to the received input. This square wave output is digitally inverted by inverter 194 before being sent to the PFC (AFE bridge) transistors Q1 and Q2 of FIG. 6.

Effectively, the feedback loop with inductor current feedback 164 is embedded within the DC voltage 166 outer control loop. While the purpose of the outer loop is to control the DC output voltage, the purpose of the inner feedback loop with inductor current feedback 164 is to provide for a very low distortion sine wave input current of unity power factor into PFC 142 (AFE bridge).

This sinusoidal reference voltage produced by the outer loop at 184, when positive, will control current from the AC source into the PFC (AFE bridge) (normally during the positive portion of the input voltage wave). This sinusoidal reference voltage, when negative, will control current from the PFC (AFE bridge) into the AC source (normally during the negative portion of the input voltage wave). A positive voltage from the current loop error amplifier 190 will produce a positive average voltage at the input boost inductor terminal Y shown in FIG. 6. A zero voltage from the current loop error amplifier will produce zero volts at inductor L1 terminal Y. A negative voltage from the current loop error amplifier will produce a negative voltage at the input boost inductor terminal Y. This characteristic differs from conventional approaches in that the control of inductor L1 terminal Y average voltage by the current error amplifier seamlessly transitions through zero volts. This characteristic is shown graphically in FIG. 9, which provides a plot of the voltage at inductor L1 terminal Y vs. the voltage output from current error amplifier and compensation block 190. Effectively, FIG. 9 shows the effect of changes in current loop error amplifier output 190 propagated through the PWM modulator, and through PFC 142 (AFE bridge), to cause the average voltage impressed onto inductor L1 terminal Y.

Figure 10:
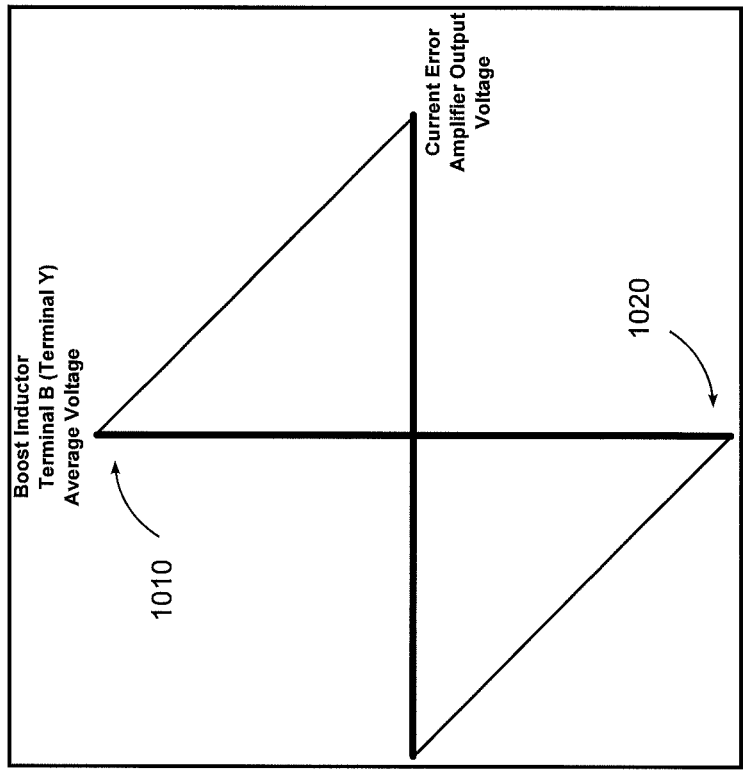
FIG. 10 is a inductor voltage vs current error amplifier output graph for a conventional PFC converter using the PFC controller shown in FIG. 7.

FIG. 10 shows a graph of a current error amplifier output vs. a boost inductor average voltage in a conventional PWM power factor control design. The conventional approach suffers from a discontinuity when transitioning though zero volts, as shown in the inductor voltage vs. the current error amplifier output graph shown in FIG. 10. More specifically, in a conventional design, when an AC input voltage wave is positive but decreasing toward zero, the current error amplifier output voltage approaches a maximum positive value, shown at 1010 in FIG. 10. Then when the input voltage crosses zero, the current error amplifier output voltage must make an instantaneous transition to its maximum negative value, shown at 1020 in FIG. 10. This voltage transition, which cannot be instantaneously realized in actual hardware, creates a delay in the response loop which causes a distortion in the current waveform. Because the embodiment shown in FIG. 8 supports a continuous transition as shown in FIG. 9, signal errors are not introduced during input voltage transitions through zero volts.

More specifically, in power factor control circuit 160, when combined with voltage converter 110, cross-over distortions are not introduced when the current (voltage) from AC power source 112 crosses through zero. Since a single signal, the output of the voltage loop error amplifier, controls the current demanded for each phase of a three phase converter system, the current processed by each phase will be inherently identical.

Figure 9:
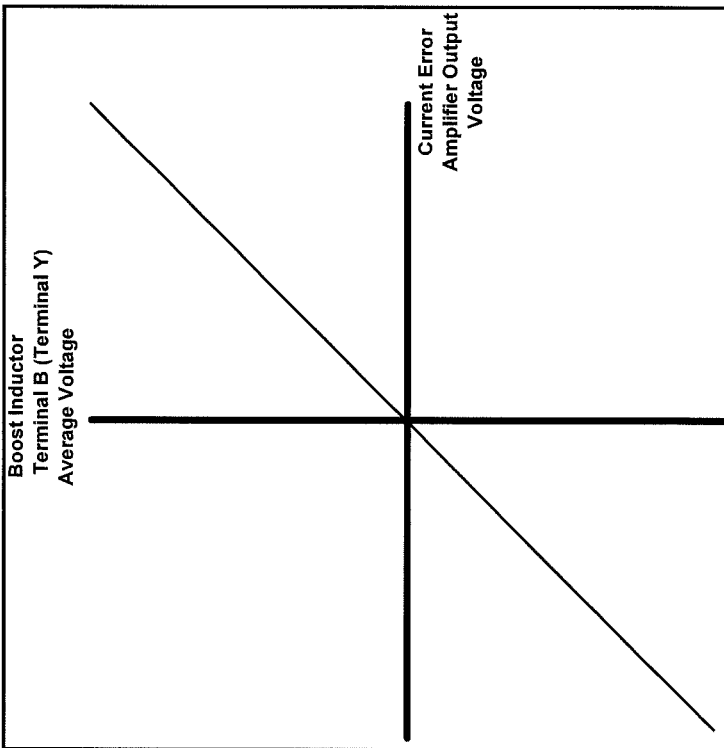
FIG. 9 is a inductor voltage (terminal Y) vs current error amplifier output graph for the voltage converter shown in FIG. 5.

As shown in FIG. 8, power factor control circuit 160 uniquely has action on PFC 142 inverted, represented by digital inversion block 194 and explained in FIG. 9. Analog inversion block 172 provides the required additional inversion to produce a negative feedback control system for the current control loop with current feedback 164. Analog inversion block 186 is inserted in the outer voltage control loop in a similar fashion to provide for a negative feedback control system for the voltage control loop.

Control of the bidirectional isolation stage 146 is typically performed at a fixed 100% duty cycle. In the event that it is desired to lower the DC output voltage set point on DC lines 149, then an additional, conventional feedback control scheme is employed to control the duty cycle to the bidirectional isolation state 146.

The provided active voltage converter system, voltage converter, and method of operating a voltage converter resulted in a number of surprising results.

By being able to adjust the voltage level on a DC output bus in real-time according to operational parameters, the system is able to take advantage of power efficiency, thermal efficiency, and/or increased performance compared to prior art systems. More concretely, by dynamically reducing the nominal DC bus voltage on a system which contains a motor that is not operating at maximum output speed, increased thermal efficiency is realized in the motor drive electronics while the desired output torque is maintained. Additionally, when operating with a higher DC bus voltage when a high motor output speed is required, a motor may benefit from an increased motor Kt induced by the higher voltage and provide increased operating efficiency since equivalent torque is produced at a lower current. Additionally, in momentary cases when greater than nominal motor output is desired, by increasing the DC bus voltage, such increased performance becomes available in real-time.

Unlike existing voltage converter systems which use a pulsed autotransformer-rectifier unit (ATRU) and have a bus voltage which is a fixed voltage proportional to the input voltage, the novel voltage converter shown and described can adjust its DC voltage in real-time. Further, the novel voltage converter provides a voltage converter which, unlike prior art systems, is capable of both transferring power either to or from a DC bus and is able to adjust the DC bus voltage level in real time. By having multiple isolated voltage converter subcircuits for each phase of an AC power supply, the voltage converter is more fault tolerant since the system will continue to work even though one or more phase subcircuits may fail. The voltage converter is scalable in that any number of phase subcircuits may be utilized, including a single phase configuration. The novel voltage converter can also provide for either single or multiple DC output voltages. The output voltages arc tightly regulated and have low output impedance. The voltage converter provides a regulated input current with low distortion and near unity power factor (power factor correction). Additionally, compared to prior art voltage converters, a cross-over distortion of less than about 1% of the input source current is achieved. The novel voltage converter operates over a wide range of input AC source frequencies including the range from DC to 1000 Hz. The control of bidirectional flow occurs automatically and without user intervention. Further, the output of the voltage converter is advantageously galvanically isolated from the input. The switching topology of the voltage converter is a low noise switching topology which enhances compatibility with use cases. The voltage converter contains automatic power flow interrupt capability for protection against output short circuit or malfunction.

Unlike existing active rectification systems with a boost circuit, which are limited to having an active AC boost circuit with an output voltage greater than 680 volts, the novel voltage converter is capable of operating from as low as 100 volts to as high as 800 volts. Additionally, the circuit topology used in the novel voltage converter eliminates the need for the input voltage rectification typically utilized prior to the PFC power components and their attendant power loss and cost. Further, the novel power factor control circuit provides a method of controlling a power factor correction active front end with virtually no cross over distortion.

While embodiments of the novel active voltage converter system, novel voltage converter, and novel methods of controlling a power factor correction circuit have been shown and described, and several modifications thereof discussed, persons skilled in this art will readily appreciate that various additional changes may be made without departing from the scope of the invention, as defined and differentiated by the following claims.

The invention claimed is:

1. A method of operating a voltage bus system, comprising: providing a voltage converter having one or more subcircuits comprising: a power supply input, an output DC voltage bus, a power factor correction circuit, a bidirectional isolation circuit, a controller configured to receive a positive output feedback signal, said controller comprising: a multiplier configured to multiply a first voltage feedback signal by a difference between a second voltage feedback signal and a voltage reference, wherein said multiplier produces a multiplier output; a first analog inverter configured to invert said multiplier output; a second analog inverter configured to invert a current feedback signal; a differential amplifier configured to amplify a difference between said first analog inverter output and said second analog inverter output; a pulse width modulation generator configured to generate a pulse width modulated signal as a function of said differential amplifier output; a third inverter configured to invert said pulse width modulated signal; and a command, wherein said controller is configured to provide said power factor correction circuit and said bidirectional isolation circuit with pulse width modulated signals; causing said voltage converter to provide a DC voltage at a first voltage level on said output DC voltage bus; receiving a target voltage change command; and dynamically adjusting said voltage converter to cause said voltage converter to provide a DC voltage at a second voltage level on said output DC voltage bus in real-time, wherein said voltage converter is operable to dynamically adjust said DC voltage to said output DC voltage bus above or below said power supply input.

2. The method as set forth in claim 1, wherein said step of providing said voltage converter comprises providing said voltage converter on an aircraft.

3. The method as set forth in claim 1, further comprising connecting a load to said output DC voltage bus.

4. The method as set forth in claim 3, wherein said step of dynamically adjusting said voltage converter is configured and arranged to cause an efficiency of said load to change.

5. The method as set forth in claim 3, wherein said load is an electric motor.

6. The method as set forth in claim 5, wherein said step of dynamically adjusting said voltage converter causes said electric motor to operate with a changed torque constant (Kt), wherein said torque constant (Kt) is non-linear with respect to said DC voltage.

7. The method as set forth in claim 1, wherein each said one or more subcircuits is connected in parallel.

8. The method as set forth in claim 1, wherein said power factor correction circuit comprises a four switch H-bridge.

9. The method as set forth in claim 1, further comprising transmitting signals from said controller to said bidirectional isolation circuit to cause said power supply input to be electrically isolated from said output DC voltage bus, wherein said controller is configured to maintain said DC voltage on said output DC voltage bus at said second voltage level.

10. A power factor correction circuit controller comprising: an AC input voltage feedback input; an input current feedback input; an output voltage feedback input; a voltage reference; a multiplier configured and arranged to multiply said AC input voltage feedback by a difference between said output voltage feedback and said voltage reference and produce a multiplier output; a first analog inverter configured and arranged to invert said multiplier output; a second analog inverter configured and arranged to invert said input current feedback; a differential amplifier configured and arranged to amplify a difference between said first analog inverter's output and said second analog inverter's output; a pulse width modulation generator configured and arranged to generate a pulse width modulated signal as a function of said differential amplifier's output; a digital inverter for inverting said pulse width modulation generator's output.

11. The power factor correction circuit controller as set forth in claim 10, further comprising a voltage converter having a power storage unit, wherein said power factor correction unit is configured and arranged to cause a voltage across said power storage unit to be generally proportional to said differential amplifier's output.

12. The power factor correction circuit controller as set forth in claim 10, further comprising a feedback scaler configured and arranged to scale one of said feedback inputs.

13. The power factor correction circuit controller as set forth in claim 10, wherein said controller is implemented on one of a complex programmable logic device, a field programmable gate array, and an application specific integrated circuit.

14. The power factor correction circuit controller as set forth in claim 10, wherein said digital inverter's output is configured and arranged to be provided to a voltage converter active front end bridge.

15. The power factor correction circuit controller as set forth in claim 14, wherein said controller is configured and arranged to cause said voltage converter to have a quality factor of approximately one.

* * * * *